United States Patent [19]

Hagihara

[11] 4,188,294
[45] Feb. 12, 1980

[54] ROTARY FILTER APPARATUS

[76] Inventor: Tadashi Hagihara, 655 Karakashiwa, Isawa-cho, Higashi-Yatsushiro, Yamanashi, Japan

[21] Appl. No.: 906,967

[22] Filed: May 18, 1978

[51] Int. Cl.² ............................................. B01D 33/02
[52] U.S. Cl. .................................. 210/160; 210/328; 210/400
[58] Field of Search ...................... 198/681, 713, 714; 210/154–161, 328–330, 400, 401

[56] References Cited

U.S. PATENT DOCUMENTS

| | | | |
|---|---|---|---|
| 1,207,376 | 12/1916 | Davidson | 210/400 X |
| 1,606,546 | 11/1926 | Wallene | 210/160 |
| 1,864,359 | 6/1932 | Laughlin et al. | 210/160 |
| 2,095,504 | 10/1937 | Kosti et al. | 210/160 |
| 3,856,678 | 12/1974 | Hagihara | 210/160 |

FOREIGN PATENT DOCUMENTS

47-7305  1/1972  Japan ...................................... 210/160

*Primary Examiner*—Robert H. Spitzer
*Attorney, Agent, or Firm*—Malin & Haley

[57] ABSTRACT

This invention relates generally to rotary filter apparatus which are capable of removing solids from water currents, and more specifically to an endless filter belt comprising specially-shaped filter plates provided between wire ropes or screen plates and rockably fitted on transverse linking rods, with the wheels on both ends of the aforesaid linking rods being regulated to the track frame installed in and over the water channel as against the wheels on both ends of the interlocking rods linking the back ends of filter plates being regulated to the inner track frame having a track different from the former, thereby making sure to arrest, transport and dump the solids and recondition the spacings or meshes as the filter medium travels around.

7 Claims, 24 Drawing Figures

ROTARY FILTER APPARATUS

SUMMARY OF THE INVENTION

The prior art filter media, which generally used wire netting for the endless filter belt surface, were subject to frequent troubles on account of being easily clogged up, less endurable and easily deformed, and were unable to transport and dump coarse or bulky matter that may be contained in the water to be filtered.

The same inventor previously corrected to aforesaid defects by his invention of U.S. Pat. No. 3,856,678. The invention, however, had a drawback in that its insufficient shock resistance ruled out the possibility of providing the larger versions thereof.

In view of the noted deficiency of the prior art, an object of this invention is to provide a novel and improved filter apparatus including a filter medium in the form of an endless moving belt comprising a number of specially-shaped filter plates fitted rockably on the linking rods provided with wire ropes or screen plates at regular intervals, which is capable of purifying water currents by arresting solids of various sizes and natures contained therein and transporting and casting them off.

Another object of the invention is to provide a filter apparatus wherein the novel filter belt has the track for the linking rods differing from that for the filter plates so that the travel of the belt will recondition the filter surface by automatically removing the filter cake completely, thus enabling an efficient purification of water currents therein.

Still another object of the invention is to provide a filter apparatus wherein the filter plates are provided with reinforcement plates so as to render high durability to and prevent the deformation of the endless filter belt and the filter plates thereof.

These objects will be accomplished through appropriate improvements, combinations and/or operation of the parts constituting this invention; the preferred embodiments will be illustrated by the accompanying drawings and the detailed description given hereinafter.

Corrections and modifications to the small constituent parts of this invention will be set forth with particularity in the appended claims.

This invention concerns a rotary filter apparatus to be installed in a water channel in order to arrest, transport and dump the solids in the water currents therethrough while reconditioning the filter meshes for continuous operation, the aforesaid apparatus including an endless belt composed of many linking rods, linking plates, wire ropes or screen plates, and specially-shaped filter plates rockably fitted on the linking rods, with the aforesaid filter belt traveling through the frame that can differentiate the track thereof from the track of the filter plates.

DESCRIPTION OF THE PREFERRED EMBODIMENTS

Figure 1:
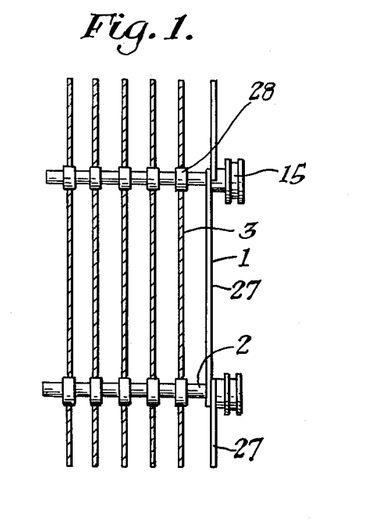
FIG. 1 is a partial top plan view of the endless belt.
Figure 2:
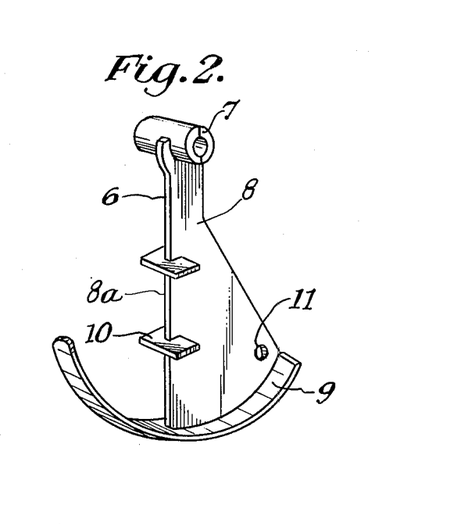
FIG. 2 is a perspective view of one of filter plates to be rockably fitted on the linking rods of the endless belt.
Figure 3:
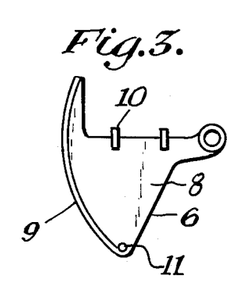
FIG. 3 is a side elevational view of the filter plate of FIG. 2.
Figure 4:
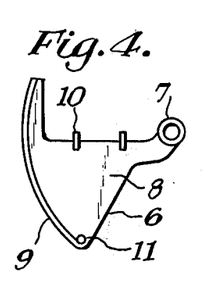
FIGS. 4 to 10 are side elevational views of other examples of filter plate.
Figure 5:
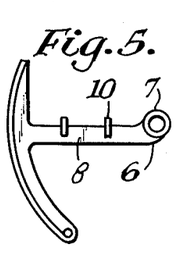
Figure 6:
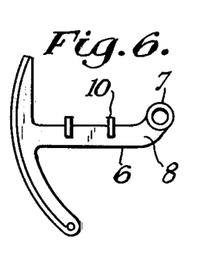
Figure 7:
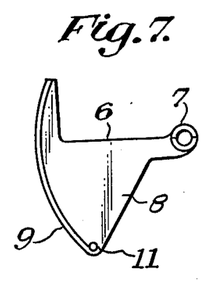
Figure 8:
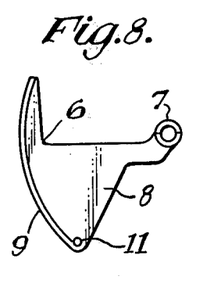
Figure 9:
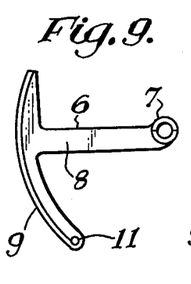
Figure 10:
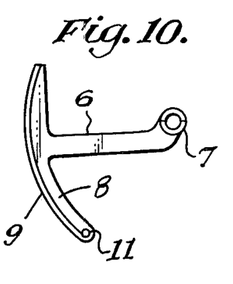
Figure 11:
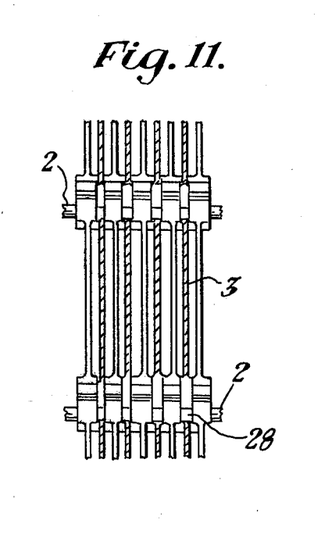
FIG. 11 is a partial top plan view of a filter belt wherein the filter plates are rockably fitted on the linking rods of the endless belt.
Figure 12:
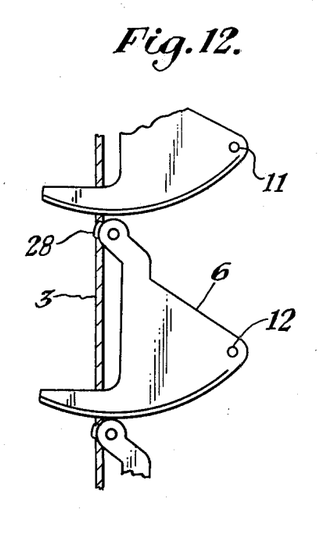
FIG. 12 is a partial side elevational view of the filter belt.
Figure 13:
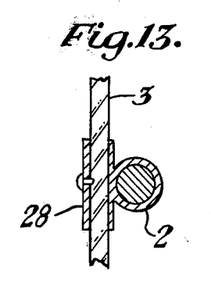
FIG. 13 is an enlarged cross-sectional view of an example of fixation made of the wire rope to the linking rod.
Figure 14:
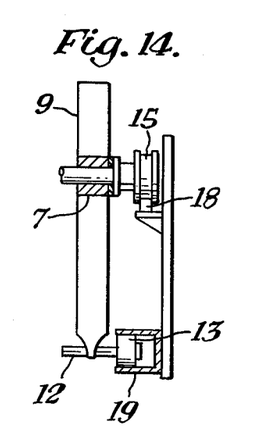
FIG. 14 is an enlarged partial cross-sectional view showing the relationship between the filter belt side and the track frame and inner track frame.

The endless belt 1 is composed of a number of linking rods 2 each having a wheel 15 at both ends thereof and linking plates 27 installed endlessly in such a manner that they overlap or underlap each other alternately where they are held by two neighboring wheels 15. A number of wire ropes 3 are stretched at regular intervals between the linking rods 2. The wire rope 3 is fixed to the linking rods 2 either by means of the clip 28 as shown in FIGS. 1 and 13 or by winding the same one time around the linking rod 2 and fixing the same with a wire fixing pin (not illustrated) so as to avoid loosening.

The filter plates 6 are fitted rockably on the linking rods 2 of the endless belt 1 between the wire ropes 3, thus organizing the filter belt 17. The wire ropes 3 can be strong nylon ropes or the like.

The filter plate 6 fitted rockably on the linking rod 2 of the endless belt 1 comprises a bearing 7 fitting over the linking rod 2, a flat separation plate 8 coupled in a united body with the bearing 7, a rocking plate 9 united to the lower end of the separation plate 8 and, as required, reinforcing plates 10 to be attached to the separation plate 8.

This filter plate 6 can be made up in one united body of steel plates, hard polyvinyl chloride plates, or the like according to the purpose and use. The bearing 7, the rocking plate 9 and the reinforcing plate 10 have each such a width that they almost touch internally between the wire ropes 3 of the endless belt 1.

The bearing 7 is made up of two halves which enable its rockable fitting over the linking rod 2.

The separation plate 8 has its separation face 8a either on the center line of the bearing 7 as shown in FIGS. 3, 5, 7, and 9, or a little below the center line as shown in FIGS. 4, 6, 8, and 10. This separaton plate 8 can be formed in such a way that only the portion along the rocking plate 9 is left as shown in FIGS. 5, 6, 9, and 10. A bore 11 is provided at the rear of the separation plate 8 to interlock transversely the filter plates 6 with each other. The filter plates 6 are thus interconnected with each other by the interlocking rod 12 passed through the bore 11. The wheel 13 is chocked up at both ends of the interlocking rod 12.

Figure 15:
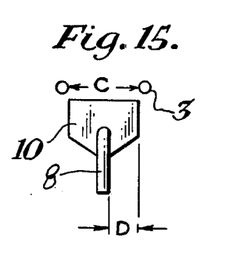
FIG. 15 is a plan view illustrating the primary spacing or mesh between the wire ropes and the secondary spacing or mesh created between the wire rope and the filter plate.

The filter surface of the filter belt 17, as shown in FIG. 15, is made up of the primary spacings or meshes a created between wire ropes 3 and the secondary spacings or meshes D between the separation plate 8 of the filter plate 6 and ropes 3.

Figure 16:
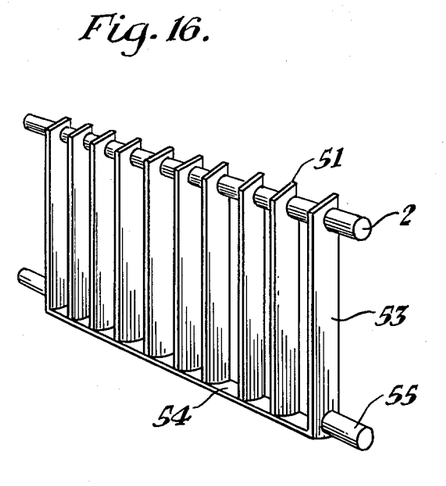
FIG. 16 is a perspective view of a screen made up of screen plates, which will constitute one block for the endless belt.
Figure 17:
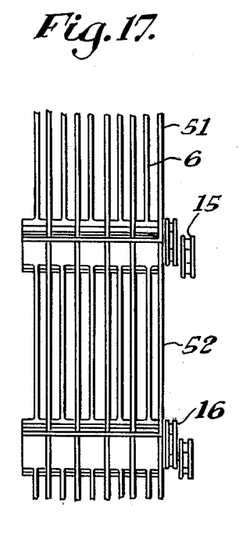
FIG. 17 is a partial top plan view of a filter belt wherein the filter plates are rockably fitted on the linking rods of the screens.
Figure 18:
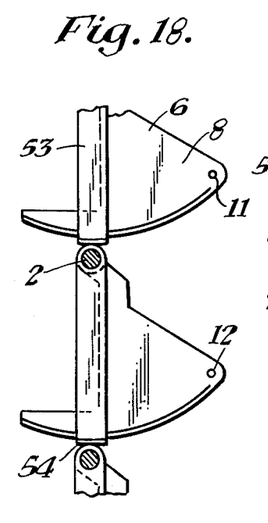
FIG. 18 is a partial side elevational view of the filter belt of FIG. 17.

The wheels 15 of the aforesaid endless filter belt 17 is fitted into the track frame 18 as shown in FIGS. 16, 17, and 18. At the same time, the wheels 13 are fitted in the inner track frame 19, adapted to guide the filter plates 6, installed on the inside of the track frame 18. The aforesaid inner track frame 19 can be excluded where the filter plates 6 do not require regulation of the track thereof.

The track frame 18 can be installed either in the seawater channel, industrial water channel, or in the drainageway 20. The base 21 is installed on the bottom of the aforessaid drainageway 20. The shaft 22 is rotatably supported by the base 21, and a sprocket 23 to engage with the linking rods 2 of the filter belt 17 is chocked up at both ends of the shaft 22 in the base 21.

A pair of columns 24 are set up uprightly on both banks of the water channel 20 or the like, and bearings (not illustrated) are provided at the top insides of the pair of columns 24 to rotatably support the shaft 25. Sprockets 26 of the same shape as the sprockets 23 are chocked up by the same distance or width to the shaft 25 rotatably supported by the bearings. The shaft 25 is interconnected to the drive means including a motor and a speed reduction means (not illustrated) mounted on one of the columns 24.

Besides the aforesaid embodiment, the endless belt 1 can also be constructed in such a manner that the screens 51 as seen in FIG. 16 are connected with each other in a series.

The screen comprises a linking rod 2 to be inserted through the filter plates 6, a number of screen plates 53 oriented at a right angle to the water flow, the upper end of which being fixedly fitted over the aforesaid linking rod 2 at regular intervals, a support plate 54 to fix the lower ends of the aforesaid screen plates 53 and an interlocking rod 55 installed at both lower sides of the screen.

The lower ends of the screen plates 53 and the support plate 54 are formed in arc having the linking rod 2 as their center.

The filter unit 52 is organized by incorporating the filter plates 6 in the aforesaid screen 51.

The endless filter belt 17 is constructed in such a manner that the wheels 15 are chocked up to both ends of the linking rod 2 of the aforesaid filter unit 52, and at the same time the interlocking rods 55 of the screen 51 is united by the linking plates 16 to the inside part of the wheels 15 of another filter unit 52.

Figure 19:
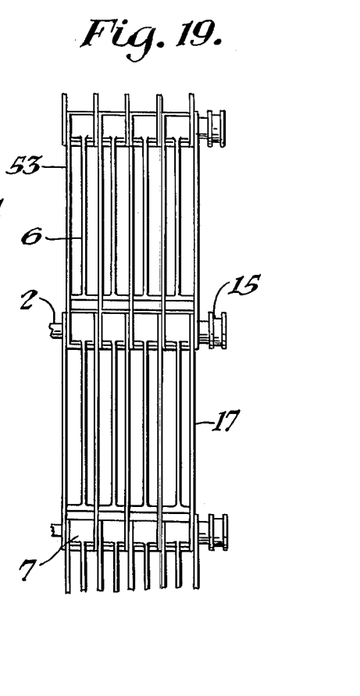
FIG. 19 is a partial top plan view of a filter belt wherein the filter plates are rockably fitted on the linking rods of another type of screens.
Figure 20:
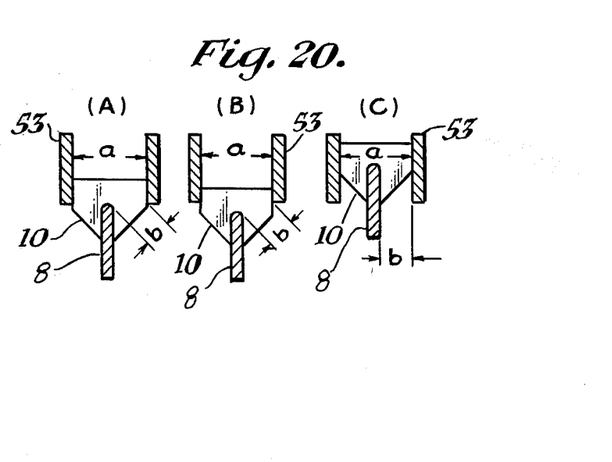
FIG. 20 is plan views showing the spacings or meshes created by combinations (A), (B), and (C) of screen plates and filter plate.
Figure 21:
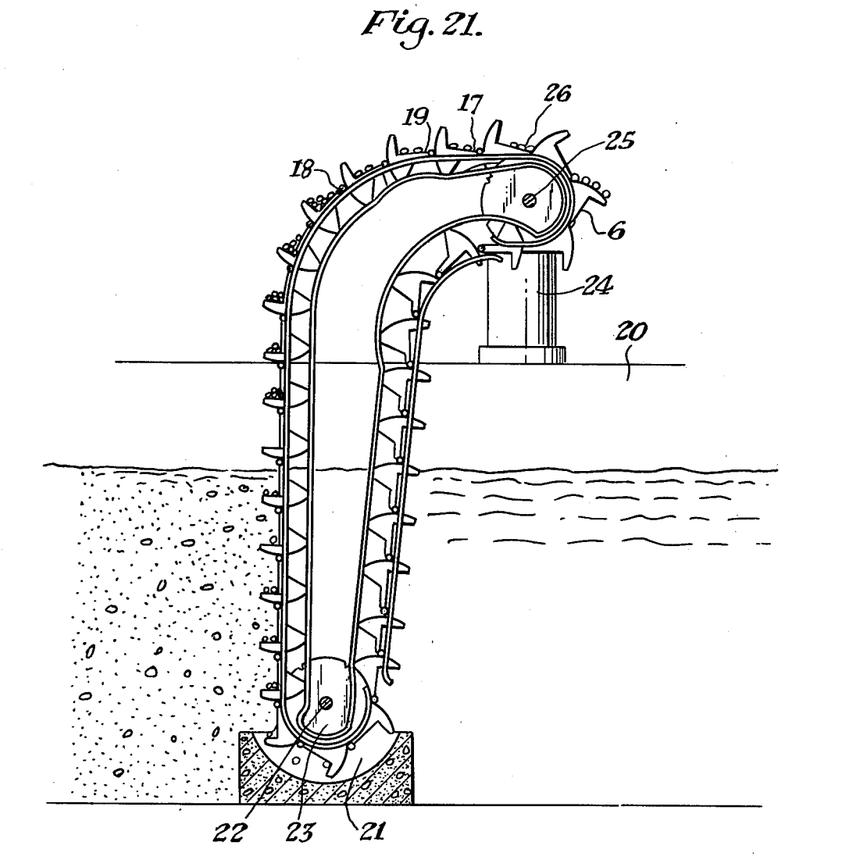
FIG. 21 is a side cross-sectional view of a vertical-type rotary filter apparatus installed in and over a water channel.
Figures 22, 23:
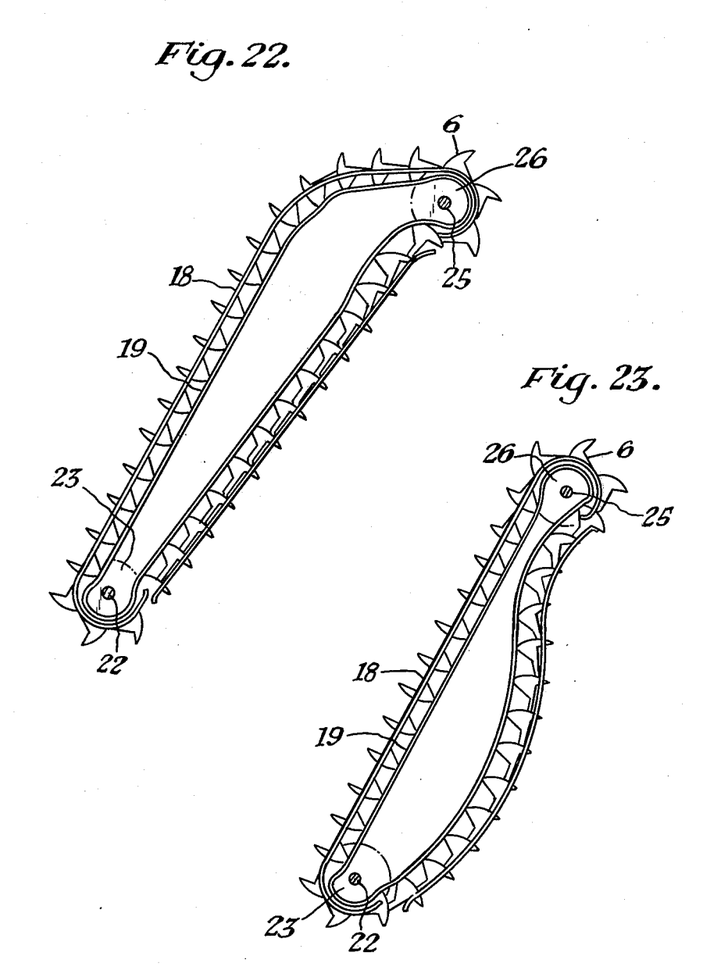
FIGS. 22 and 23 are side elevational views of filter belts installed on different track frames.
Figure 24:
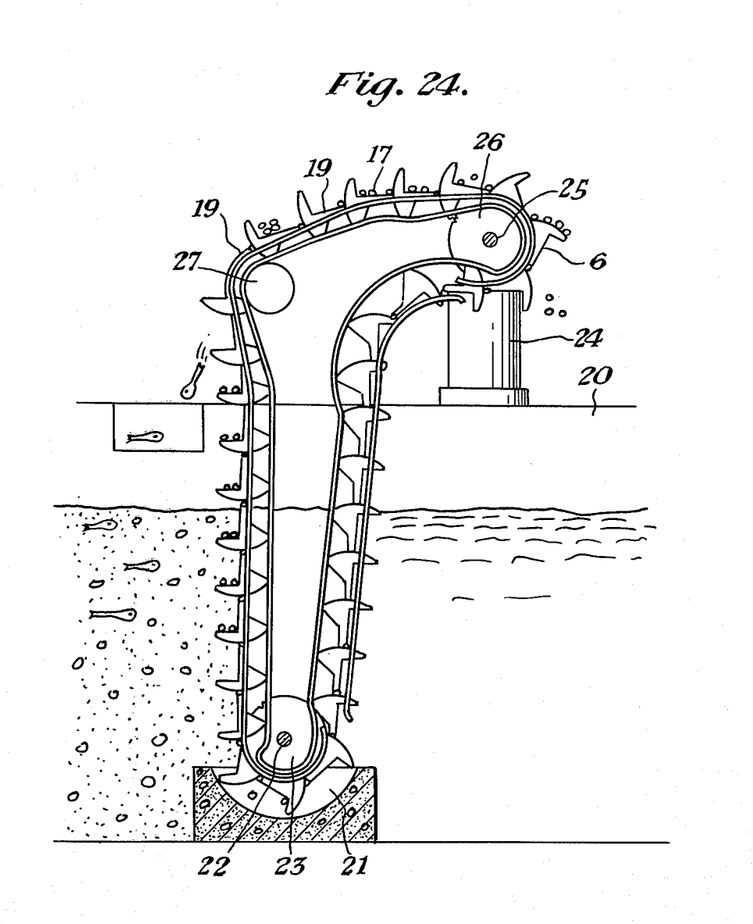
FIG. 24 is a side cross-sectional view of a modified vertical-type rotary filter apparatus installed in and over a water channel.

As seen in FIG. 19, the same can also be constructed in such a manner that the filter plates 6 are rockably incorporated in each belt stage comprising the screen plates 53 fixed at upper and lower ends to the linking rods 2 at alternate transverse positions stage by stage.

In the operation of the rotary filter apparatus according to this invention constructed as hereinbefore described and installed in the seawater or industrial water channel or drainageway 20, the drive means is first set in motion to cause the filter belt 17 to rotate, thus purifying the water flowing therethrough. As the water passes through the filter belt 17, relatively large solids are arrested by the surface of the filter medium or the primary spacings or meshes a formed by the wire ropes 3 or the screen plates 53 provided thereto while smaller solids are arrested by the secondary spacings or meshes b formed between the separation plates 8 of filter plates 6 and the wire ropes 3 or the screen plates 53. The solids thus arrested by the filter medium are thereby conveyed upwardly held by the rocking plates 9 of the filter plates 6, pushed out by the aforesaid rocking plates 9 at the upper turn of the filter belt 17, and drop into a box or the like provided thereunder. The water currents thus purified flow downstream. The filter belt 17 past the upper turn backs away guided by the inner track frame 19 and then returns to the original position, thus reconditioning the filter surface. Also, the solids near the bottom of the water channel are skimmed up at the lower turn of the filter belt 17.

As hereinbefore described, the rotary filter apparatus relating to this invention comprises the filter medium 17 in the form of an endless belt with the filter plates 6 fitted rockably on the linking rods 2 between either wire ropes 3 or screen plates 53, the track frame 18 regulating the course of rotation of the filter belt 17 and the inner track frame 19 regulating the course of rotation of the filter plates 6 as different from the track of the former, thus causing rocks to the filter plates 6, and the drive means adapted to cause the filter belt 17 to rotate. As the filter belt 17 travels along the two different tracks, the solids contained in water currents are arrested, or skimmed at the lower turn of the filter belt 17, transported and dumped while the surface of the filter medium is automatically reconditioned for continuous operation. Also, the filter plates 6, provided additionally with reinforcing plates 10, will successfully resist deformation stresses. Thus, the apparatus relating to this invention will prove to have extremely great practical and economical rewards, featuring such advantages as simple structure, less frequent troubles, possibility of mass production for lower costs, excellent durability, etc.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A rotary filter apparatus for continuous removal of solids from water currents in a channel of given width and depth, comprising:
   a frame with a first track and a second track installed at least partially in said water currents in the channel,
   a filter medium in the form of an endless belt, said filter medium including endless connecting means for forming the endless belt, a number of transverse linking rods each with at least one track means on one end thereof, said linking rods linked to said endless connecting means and positioned parallel with each other, said track means for following said first track positioned in working relationship to said first track, said filter medium including screen means for filtering purposes incorporated longitudinally with respect to said endless connecting means, said screen means includes a plurality of parallel members positioned longitudinally with respect to said endless connecting means, a filter plate positioned between each said parallel members and fitted rockably on one of said linking rods, said filter plate including a forward portion and a rear portion, transverse interlocking rods including at least one interlocking rod tracking means on at least one end of each transverse interlocking rod, said interlocking rod tracking means for following said second track and positioned in working relationship to said second track and positioned to pass through said rear portion of each said filter plate, and drive means for imparting rotation to said filter medium which travels with said linking rods regulated by said first track of said frame and said interlocking rods regulated by said second track of said frame.

2. The apparatus as set forth in claim 1, wherein:
said filter plate includes a bearing member, a flat separation plate with one end connected to said bearing member, and an arc-shaped rocking plate, said rocking plate coupled transversely to the other end of said separation plate, said rocking plate arched with a center thereof at the center of said bearing member.

3. The apparatus as set forth in claim 2, wherein:
said forward portion including a leading separation edge positioned on a radial line from said center of said bearing member.

4. The apparatus as set forth in claim 2, wherein:
said forward portion includes a leading separation edge positioned below a radial line from said center of said bearing member.

5. The apparatus as set forth in claim 1, including:
reinforcing plates connected to said separation plate of said filter plate.

6. The apparatus as set forth in claim 1, wherein:
said frame including a top and a bottom,
said second track of said frame is positioned closer to said first track of said frame at said top and is further away therefrom between said top and said bottom.

7. The apparatus as set forth in claim 1, wherein:
each said filter plate is rockably fitted for movement of said forward portion between said parallel members.

* * * * *